Patented May 7, 1940

2,199,710

UNITED STATES PATENT OFFICE 2,199,710

COMPOSITION OF MATTER AND METHOD OF MAKING SAME

Irving E. Muskat, Akron, Ohio, assignor to Pittsburgh Plate Glass Company, Allegheny County, Pa., a corporation of Pennsylvania No Drawing. Application November 26, 1937, Serial No. 176,645

12 Claims. (Cl. 134—58)

This invention relates to the production of calcium carbonate. In general, this compound is prepared by precipitation from an aqueous solution or suspension of certain calcium compounds, for example, calcium hydroxide or calcium chloride. Since the production of a finely divided product is generally recognized as desirable for certain commercial usages, the conditions of precipitation of the calcium carbonate are carefully controlled in order to secure as fine a precipitate as possible.

This precipitate, after filtration, usually contains very substantial quantities of water which must be removed if it is to be used as a satisfactory pigment or filler. If the filter cake obtained after filtration is dried without further treatment, the finely divided calcium carbonate particles agglomerate to such an extent that the product is unsatisfactory for many purposes. Accordingly, certain coating agents are occasionally incorporated in the precipitated and washed slurry prior to the final filtration. When this product is dried and pulverized it is found to be exceedingly fine.

In accordance with my invention, I have found that when finely divided calcium carbonate having a particle size preferably less than one micron is coated or thoroughly intermixed with sulphur particles, a particularly advantageous product is produced. If the sulphur is added to the calcium carbonate slurry previous to drying, it is found that the slurry may be thoroughly dried to yield a fine pigment without the necessary addition of other coating agents. Furthermore, the product disperses more readily than ordinary calcium carbonate when added to certain mixtures such as paint or rubber compositions, and appears to improve the aging qualities of rubber compositions in which it may be used. The product also appears to be less water absorbent and less alkaline than ordinary calcium carbonate.

If desired, a dispersing agent may be added to the calcium carbonate. I have found that non-drying oils such as coconut oil, palm oil, lard oil, lard, tallow, sperm oil, cottonseed oil, etc., or higher saturated fatty acids such as palmitic, stearic, and lauric acids or corresponding esters such as the corresponding glycerides assist in the preparation of an improved calcium carbonate. When these materials are added to the sulphur-calcium carbonate mixture, the product may be more uniformly distributed throughout rubber mixtures in which they are incorporated, and, if added prior to the drying step, they assist in the production of a dry finely divided product. Coconut oil has been found to be very advantageous for this purpose.

The following examples illustrate the invention:

*Example I.*—A calcium carbonate slurry containing 210 grams per liter of precipitated carbonate having an average particle size of less than one micron was treated with 0.5% of colloidal sulphur calculated on the basis of anhydrous calcium carbonate and after thorough intermixing, the product was filtered. The filter cake which contained approximately 50% water was gradually heated up to a temperature of approximately 350° F. until the cake was dry. The dried product was then pulverized in a hammer mill and a finely divided product having a particle size of 0.2 to 0.4 micron was produced. This product was readily dispersible in rubber mixtures.

*Example II.*—A similar slurry was mixed with 0.5% coconut oil and 0.5% colloidal sulphur and after drying a finely divided product, which was easily dispersible in rubber mixtures, was produced.

*Example III.*—A slurry containing 125 grams per liter of calcium hydroxide was vigorously agitated with sodium carbonate in an amount of 30% in excess of that theoretically necessary to convert the hydroxide to calcium carbonate. A slurry of fine calcium carbonate having an average particle size of less than one micron was produced which was then washed and repulped until 10 cc. of the slurry, containing 210 grams per liter of calcium carbonate, required 4 cc. of 0.1 normal HCl to attain the phenolphthalein endpoint. One portion of this slurry was treated with 1% sulphur and after thorough intermixing, the product was filtered and dried. The amount of $Na_2O$ present in the dried filter cake was determined by titration of samples thereof with HCl, using phenolphthalein and methyl orange as indicators.

A second portion of the calcium carbonate slurry was filtered and dried without addition of sulphur and the amount of $Na_2O$ present therein determined by similar titrations. The following results were obtained:

|  | Phenolphthalein titration, percent $Na_2O$ | Methyl orange titration, percent $Na_2O$ |
|---|---|---|
| Untreated calcium carbonate | 0.096 | 0.238 |
| Sulphur treated calcium carbonate | 0.012 | 0.058 |

The sulphur treated carbonate produced by this process was found to be a highly satisfactory rubber reinforcing pigment which was readily dispersible in rubber compositions.

The amount of sulphur to be used may be varied within reasonable limits. Usually, it is preferred to use 0.2% or more of sulphur in the mixture but smaller amounts may be permissible in some cases. Small excess concentrations may not be objectionable if the pigment is to be used in a rubber composition since sulphur would be added to the rubber composition in any event. In general, it is preferred to use sulphur concentrations not substantially in excess of 2% calculated upon the basis of the anhydrous carbonate but some departure from this concentration is permissible without causing a reduction in the strength of the final rubber product. Concentrations up to about 5% of the coconut oil or other agent may be used but large excesses of the agent should be avoided since otherwise the strength of the rubber product will be decreased.

It is not essential that the sulphur used be in the colloidal state but it is preferred that it be finely divided and in general, sulphur which is as fine or finer than the calcium carbonate being treated, may be used. Colloidal sulphur has been used since it appears to promote the production of a sulphur coating upon the particles themselves. If desired, the dispersing agent and the sulphur may be intermixed prior to their addition to the calcium carbonate but this is not essential and the two materials may be separately or simultaneously added at any convenient point in the manufacture of the pigment, for example, either before, during, or after precipitation of the carbonate.

The fineness of the product is capable of some variation but where it is to be used as a rubber reinforcing pigment, it is preferred that the particle size should not substantially exceed approximately one micron in diameter. Calcium carbonate coated or mixed with sulphur, as herein described may be used as a reinforcing pigment in rubber compositions, as a filler for paper products, or as a pigment for paints. Other uses will suggest themselves to those skilled in the art.

Although the present invention has been described in connection with the specific details of certain embodiments thereof, it is not intended that such details shall be regarded as limitations upon the scope of the invention except insofar as included in the accompanying claims.

I claim:

1. A method of preparing substantially dry, substantially unagglomerated, finely divided calcium carbonate having an average particle size not in excess of one micron from an aqueous slurry containing said carbonate, which comprises mixing a substantial quantity not in excess of about 2% by weight of finely divided sulphur therewith, calculated upon the weight of calcium carbonate, the average particle size of said sulphur being not in excess of that of the calcium carbonate, and drying the mixture.

2. A method of preparing substantially dry, substantially unagglomerated, finely divided calcium carbonate having an average particle size not in excess of one micron from an aqueous slurry containing said carbonate, which comprises mixing a substantial quantity not in excess of about 2% by weight of finely divided sulphur having an average particle size not in excess of that of said carbonate and a nondrying oil therewith and drying the mixture.

3. A method of preparing substantially dry, substantially unagglomerated, finely divided calcium carbonate having an average particle size not in excess of one micron from an aqueous slurry containing said carbonate, which comprises mixing a substantial quantity not in excess of about 2% by weight of finely divided sulphur having an average particle size not in excess of that of said carbonate and coconut oil therewith and drying the mixture.

4. A method of preparing substantially dry, substantially unagglomerated, finely divided calcium carbonate having an average particle size not in excess of one micron from an aqueous slurry containing said carbonate, which comprises mixing a substantial quantity not in excess of about 2% by weight of colloidal sulphur and a nondrying oil therewith and drying the mixture.

5. A method of preparing substantially dry, substantially unagglomerated, finely divided calcium carbonate having an average particle size not in excess of one micron from an aqueous slurry containing said carbonate, which comprises mixing a substantial quantity not in excess of about 2% by weight of colloidal sulphur therewith, calculated upon the weight of calcium carbonate, and drying the mixture.

6. A composition suitable for use as a pigment which comprises finely divided substantially unagglomerated calcium carbonate having an average particle size not in excess of one micron as a preponderant ingredient coated with a dispersing agent and a substantial quantity not in excess of about 2 percent of finely divided sulphur having an average particle size not in excess of that of said carbonate.

7. A composition suitable for use as a pigment which comprises finely divided substantially unagglomerated calcium carbonate having an average particle size not in excess of one micron as a preponderant ingredient coated with a nondrying oil and a substantial quantity not in excess of about 2 percent of finely divided sulphur having an average particle size not in excess of that of said carbonate.

8. A composition suitable for use as a pigment which comprises finely divided substantially unagglomerated calcium carbonate having an average particle size not in excess of one micron as a preponderant ingredient coated with coconut oil and a substantial quantity not in excess of about 2 percent of finely divided sulphur having an average particle size not in excess of that of said carbonate.

9. A composition suitable for use as a pigment which comprises finely divided substantially unagglomerated calcium carbonate having an average particle size not in excess of one micron as a preponderant ingredient coated with a glyceride of the higher saturated fatty acids and a substantial quantity not in excess of about 2 percent of finely divided sulphur having an average particle size not in excess of that of said carbonate.

10. A composition of matter comprising finely divided substantially unagglomerated calcium carbonate having an average particle size not in excess of one micron coated with a substantial quantity not in excess of about 2 percent of finely divided sulphur based upon the weight of the calcium carbonate, the average particle size of said sulphur being not in excess of that of the calcium carbonate.

11. A composition of matter comprising finely divided substantially unagglomerated calcium carbonate having an average particle size not in excess of one micron coated with a substantial quantity not in excess of about 2 percent of colloidal sulphur based upon the weight of calcium carbonate.

12. A composition suitable for use as a pigment which comprises finely divided calcium carbonate having an average particle size not in excess of one micron as a preponderant ingredient coated with a higher saturated fatty acid and a substantial quantity not in excess of about 2 percent of finely divided sulphur having an average particle size not in excess of that of said carbonate.

IRVING E. MUSKAT.